(12) United States Patent
Chen

(10) Patent No.: US 12,234,091 B2
(45) Date of Patent: Feb. 25, 2025

(54) TRASH CAN HAVING EASY-TO-ASSEMBLE LID AND DECORATIVE RING

(71) Applicant: EKO GROUP LTD, Jiangmen (CN)

(72) Inventor: Yizhi Chen, Jiangmen (CN)

(73) Assignee: EKO GROUP LTD, Jiangmen (CN)

( * ) Notice: Subject to any disclaimer, the term of this patent is extended or adjusted under 35 U.S.C. 154(b) by 38 days.

(21) Appl. No.: 18/336,836

(22) Filed: Jun. 16, 2023

(65) Prior Publication Data

US 2023/0322483 A1  Oct. 12, 2023

(30) Foreign Application Priority Data

Nov. 17, 2022 (CN) .......................... 202223059307.8

(51) Int. Cl.
*B65F 1/14* (2006.01)
*B65F 1/06* (2006.01)
*B65F 1/16* (2006.01)

(52) U.S. Cl.
CPC .............. *B65F 1/1646* (2013.01); *B65F 1/06* (2013.01); *B65F 1/163* (2013.01)

(58) Field of Classification Search
CPC .......... B65F 1/1646; B65F 1/06; B65F 1/163; B65F 1/16; B65F 1/1615; B65F 43/163; B65F 43/166; B65F 43/262
USPC ..... 220/495.08, 495.06, 263, 810, 836, 843, 220/259.2, 259.1, 254.1, 255, 256.1
See application file for complete search history.

(56) References Cited

U.S. PATENT DOCUMENTS

2017/0197786 A1* 7/2017 Shek .................... B65F 1/1468

FOREIGN PATENT DOCUMENTS

| CN | 207973087 U | 10/2018 |
| CN | 214268882 U | 9/2021 |
| CN | 217554773 U | 10/2022 |

* cited by examiner

*Primary Examiner* — Don M Anderson
*Assistant Examiner* — Elizabeth J Volz

(57) ABSTRACT

A trash can having an easy-to-assemble lid and a decorative ring, including a trash can body and a lid in a split-type design. The lid is arranged at an opening of the body, and can flip with respect to the body. The lid is configured to cover the opening of the body. The trash can further includes a connecting part at the opening of the body. The connecting part is in snap-fit connection with the lid, and is capable of flipping with respect to the body to drive the lid to flip with respect to the body.

10 Claims, 10 Drawing Sheets

TRASH CAN HAVING EASY-TO-ASSEMBLE LID AND DECORATIVE RING

CROSS-REFERENCE TO RELATED APPLICATIONS

This application claims the benefit of priority from Chinese Patent Application No. 202223059307.8, filed on Nov. 17, 2022. The content of the aforementioned application, including any intervening amendments thereto, is incorporated herein by reference in its entirety.

TECHNICAL FIELD

The present disclosure relates to trash cans, and more particularly to a trash can having an easy-to-assemble lid and a decorative ring.

BACKGROUND

Flipping trash cans have a lid hingedly connected to the trash container. However, the excessive size will greatly increase the transportation cost if the trash cans are transported in a well-assembled form. During the transportation, the trash containers are stacked, and the lids are places inside the container at the top. Accordingly, the semi-finished trash can components need to subject to secondary assembly (by sales staff or user), and thus an easy assembly of the cover to the trash container is required.

In the prior art, for the convenient assembly of the flipping structure, a cylindrical block and a corresponding hole are often arranged to enable the rotating fit between the container and lid. In order to ensure the structural strength, the block and hole are respectively arranged in non-elastic areas of the lid and the container, and in this case, a considerable force is required to press the block into the hole, resulting in poor user experience. In addition, high requirements are raised for the size precision of the block. Excessive size will lead to unsuccessful assembly; and the insufficient size will render the structure loose and unstable. Moreover, for easy installation, a thinner sheet-shaped structure or C-shaped ring which can subject to elastic deformation is additionally arranged, on which the block or hole is arranged. Optionally, the C-shaped ring is used as a clamping fastener, such that the sheet-shaped structure or the C-shaped ring can be elastically deformed under the action of a small force to form the rotational snap fit. Unfortunately, considering that the block and the hole are the main stress structures during the flipping process, the strength of the sheet-shaped structure or the C-shaped ring is insufficient, and frequent flipping will cause deformation or fracture, making the lid unstable and prone to falling off from the container or fail to flip normally.

Chinese patent application No. 202022841545.9 discloses a detachable lid assembly with mortise-tenon structure for trash cans, including a trash container. The trash container is provided with a lid and a handle. The connection between the trash container, lid and handle is enabled through a lid fixing hole, a handle fixing hole, a mortise-tenon expansion latch and a connecting wire assembly. The mortise-tenon expansion bolt includes a knob, a latch post, a latch boss and a wire-locking hole. The latch post has a hollow expansion structure. Inside the lid fixing hole is provided with a groove for accommodating a lid latch boss. The handle fixing hole is provided with a groove for accommodating a handle latch boss and a groove configured for the rotation of a handle latch. The connecting wire assembly includes a lid wire-locking hole, a latch wire-locking hole, a connecting wire and a connecting wire wire-locking hole.

The trash can provided in the above-mentioned patent application has easy and simple lid installation and detachment, and overcomes the problems that the lid is not easy to remove, and the latch is prone to damage. Whereas, the mortise-tenon structure will make the lid non-rotatable, and thus another opening is required receive the trash. Therefore, such design is suitable for public trash cans which require a larger volume, but not suitable for household trash cans.

SUMMARY

Accordingly, the present disclosure provides an assembly structure for a trash can lid to overcome the technical problems in the prior art.

Technical solutions of this application are specifically described as follows.

This application provides a trash can having an easy-to-assemble lid and a decorative ring, comprising:
  a trash can body;
  a lid; and
  a connecting part;
  wherein the lid is arranged at an opening of the trash can body; and the lid is capable of flipping with respect to the trash can body, and is configured to cover the opening of the trash can body; and
  the connecting part is arranged at the opening of the trash can body; the connecting part is in snap-fit connection with the lid; and the connecting part is capable of flipping with respect to the trash can body to drive the lid to flip with respect to the trash can body.

In some embodiments, the lid is provided with an insertion slot; the connecting part comprises an inserting block and a rotatable connecting shaft cylinder; the inserting block is arranged at a top end of the rotatable connecting shaft cylinder; the rotatable connecting shaft cylinder is coaxially connected to the trash can body, such that the connecting part is capable of flipping with respect to the trash can body; and the inserting block is configured to be inserted into the insertion slot to enable snap-fit connection between the connecting part and the lid.

In some embodiments, the connecting part further comprises two clamping tabs; the two clamping tabs are arranged at the top end of the rotatable connecting shaft cylinder; one of the two clamping tabs is provided at a first side of the inserting block, and the other of the two clamping tabs is provided at a second side of the inserting block; a clearance is provided between each of the two clamping tabs and the inserting block; the two clamping tabs are elastic; two side walls of the insertion slot are each provided with a gap; and the two clamping tabs are configured to be respectively clamped in gaps of the two side walls of the insertion slot to fix the inserting block with respect to the insertion slot.

In some embodiments, the connecting part further comprises a connecting base; one end of the connecting base is connected to the rotatable connecting shaft cylinder, and the other end of the connecting base is connected to the inserting block; and
  the trash can further comprises a pedal and a support rod; the pedal is arranged at a bottom end of an outer side wall of the trash can body; and one end of the support rod is connected to the pedal, and the other end of the support rod is connected to the connecting base, so as to drive the lid to flip.

In some embodiments, the trash can further comprises:

at least one rotatable connection shaft; and a shaft hole base;

wherein the shaft hole base is arranged at the opening of the trash can body, and is provided with a first shaft hole; the rotatable shaft cylinder is provided with a second shaft hole; and the at least one rotatable connection shaft is configured to be inserted into the first shaft hole and the second shaft hole to coaxially connect the rotatable connecting shaft cylinder with the shaft hole base, such that the connecting part is capable of flipping with respect to the trash can body.

In some embodiments, an accommodating groove is arranged at the outer side wall of the trash can body; the pedal is arranged inside the accommodating groove; and the pedal is capable of flipping with respect to the trash can body, so as to be accommodated inside the accommodating groove.

In some embodiments, the trash can further comprises:

a decorative ring;

wherein the decorative ring is arranged at the opening of the trash can body; the decorative ring is configured to allow trash to enter an interior of the trash can body; and the cover is configured to cover an inner ring of the decorative ring.

In some embodiments, the decorative ring is coaxially connected to the shaft hole base; and the decorative ring is capable of rotating with respect to the shaft hole base.

In some embodiments, the decorative ring is provided with a third shaft hole; and the at least one rotatable connection shaft is configured to be inserted into the first shaft hole, the second shaft hole and the third shaft hole to coaxially connect the decorative ring, the rotatable connecting shaft cylinder and the shaft hole base, such that the decorative ring is capable of flipping with respect to the trash can body.

In some embodiments, the trash can further comprises a bag pressing ring; an inner side wall of the decorative ring is provided with a first protrusion; the first protrusion is annular; and the bag pressing ring is provided at the first protrusion.

In some embodiments, the trash can further comprises:

a second protrusion; and a support rib;

wherein the second protrusion is arranged at the inner side wall of the decorative ring, and above the first protrusion; the support rib is arranged at the first protrusion, and below the second protrusion; and the second protrusion is configured to match with the support rib to clamp the bag pressing ring between the second protrusion and the support rib.

Compared to the prior art, this application has the following beneficial effects.

Firstly, this application adopts a split-type (detachable) design for the trash can body and the lid, such that multiple trash can bodies can be stacked during the transportation to reduce the space occupation, facilitating the control of the transportation cost.

In addition, the rotary connection structure of the trash can body and the lid is the main stress structure, and thus has high requirements for both the connection firmness and structural strength. However, the stable connection and higher structural strength often lead to higher assembly difficulty. Therefore, in the implementation of this application, a rotatable connecting part is pre-installed at the opening before delivery, and the users just need to install a simple snap-fit structure. Since the rotatable connecting part has been pre-installed by the professional manufacturer before delivery, it can be designed into a structure with higher structural strength and larger installation difficulty to reach the desired service life. The snap-fit structure, which is not the main stress structure, can be designed with lower strength but simple assembly, improving user experience and reducing the return rate.

Furthermore, compared to the trash can products without the decorative ring, the trash can with the decorative ring pre-installed at the body is more conspicuous and aesthetic, and can attract consumers' attention more easily, leading to an increase in sales.

Figure 1:
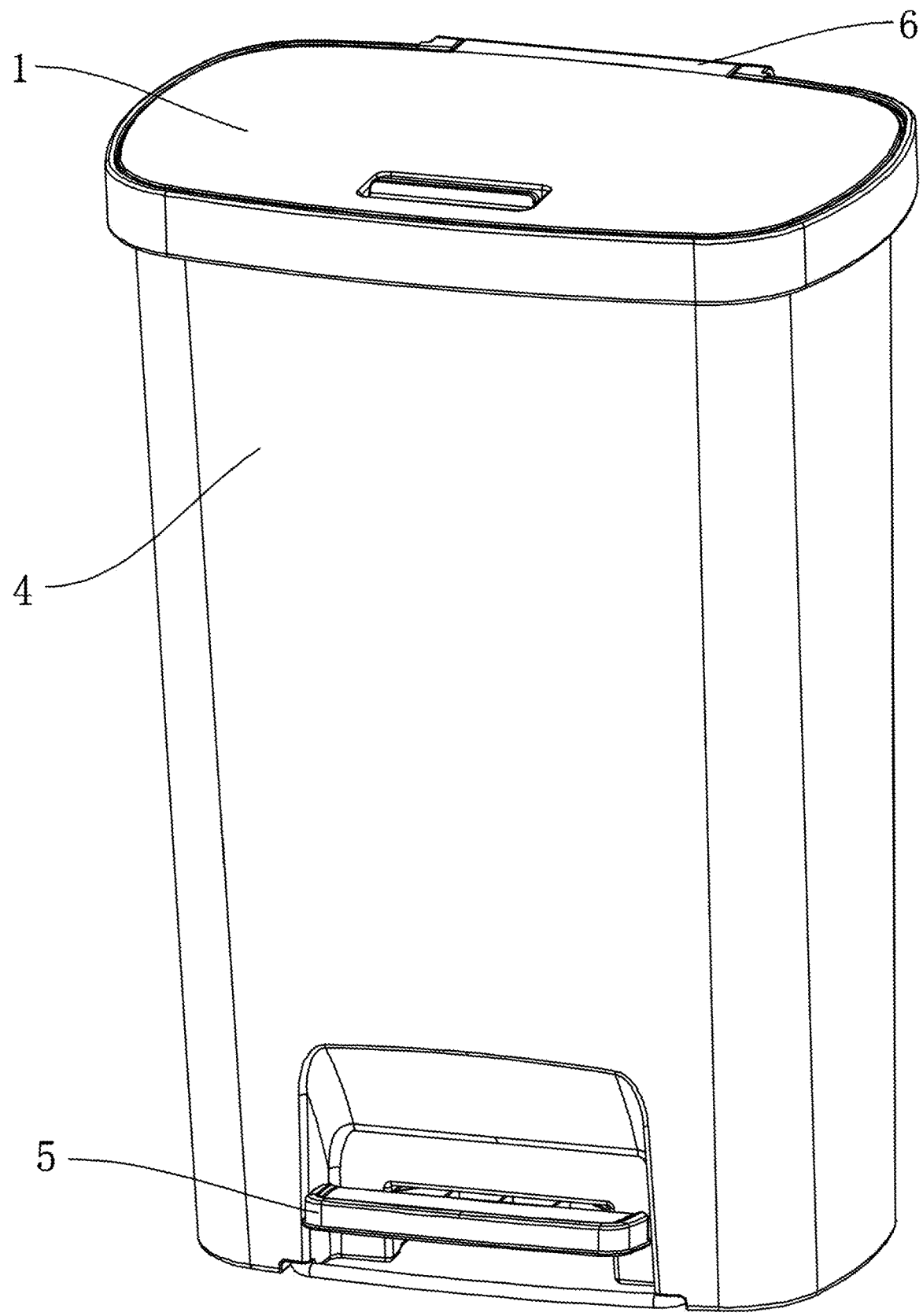
FIG. 1 structurally depicts a trash can according to an embodiment of the present disclosure with a lid closed.
Figure 2:
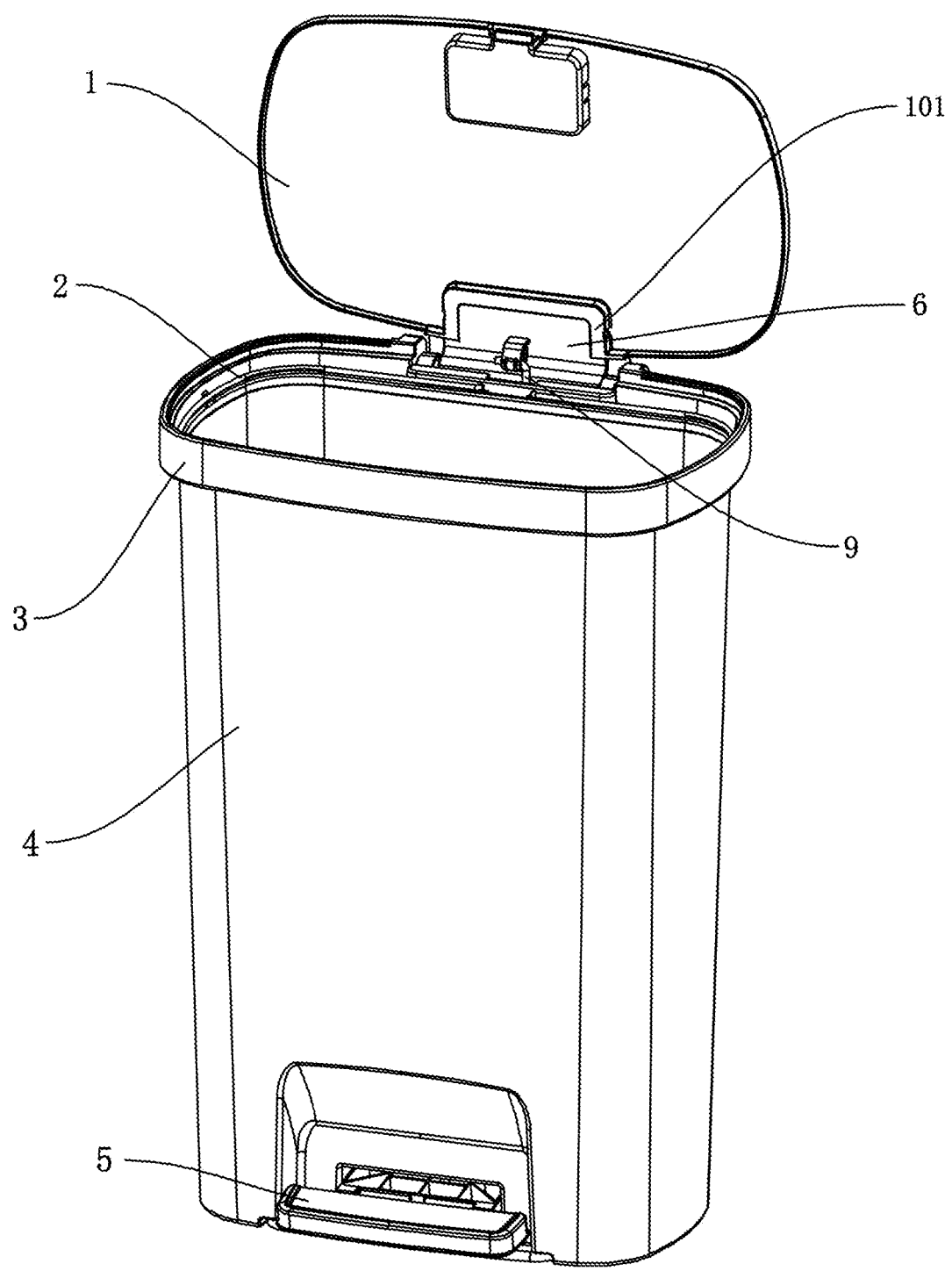
FIG. 2 structurally depicts the trash can according to an embodiment of the present disclosure with the lid opened and a bag pressing ring clamped.
Figure 3:
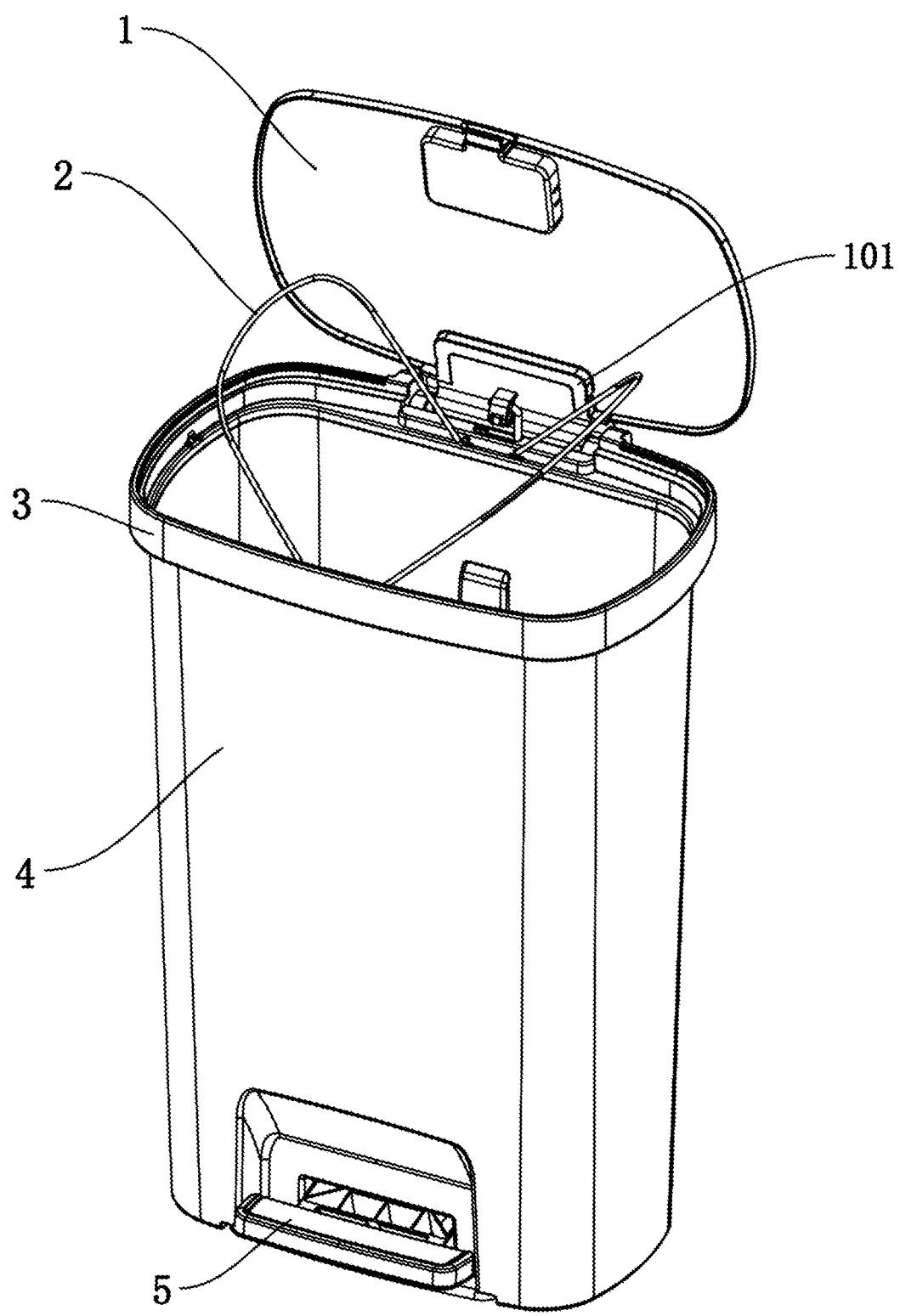
FIG. 3 structurally depicts the trash can according to an embodiment of the present disclosure with the lid opened and the bag pressing ring rotated upward.
Figure 4:
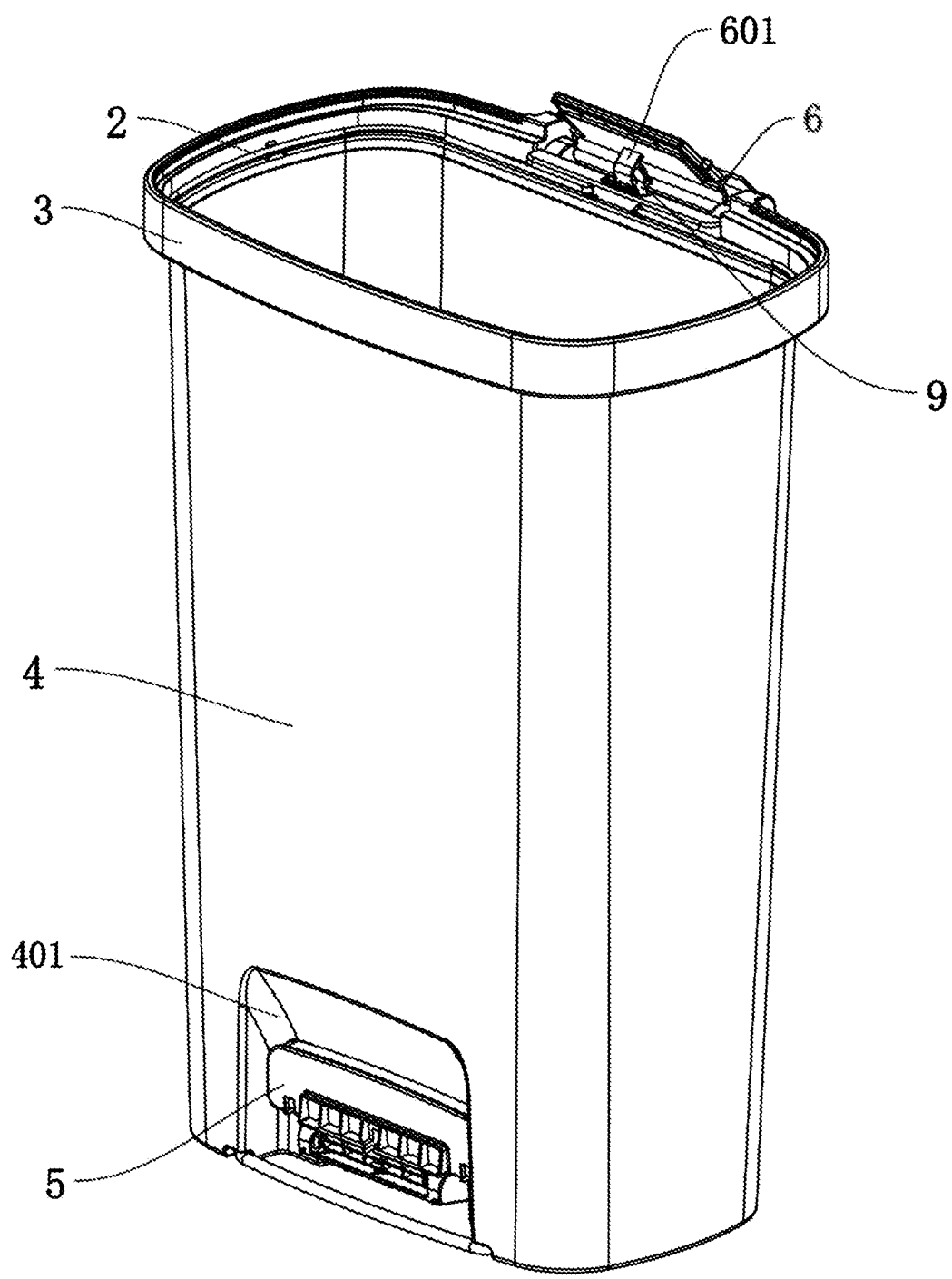
FIG. 4 structurally depicts the trash can according to an embodiment of the present disclosure without the lid and with a pedal retracted.
Figure 5:
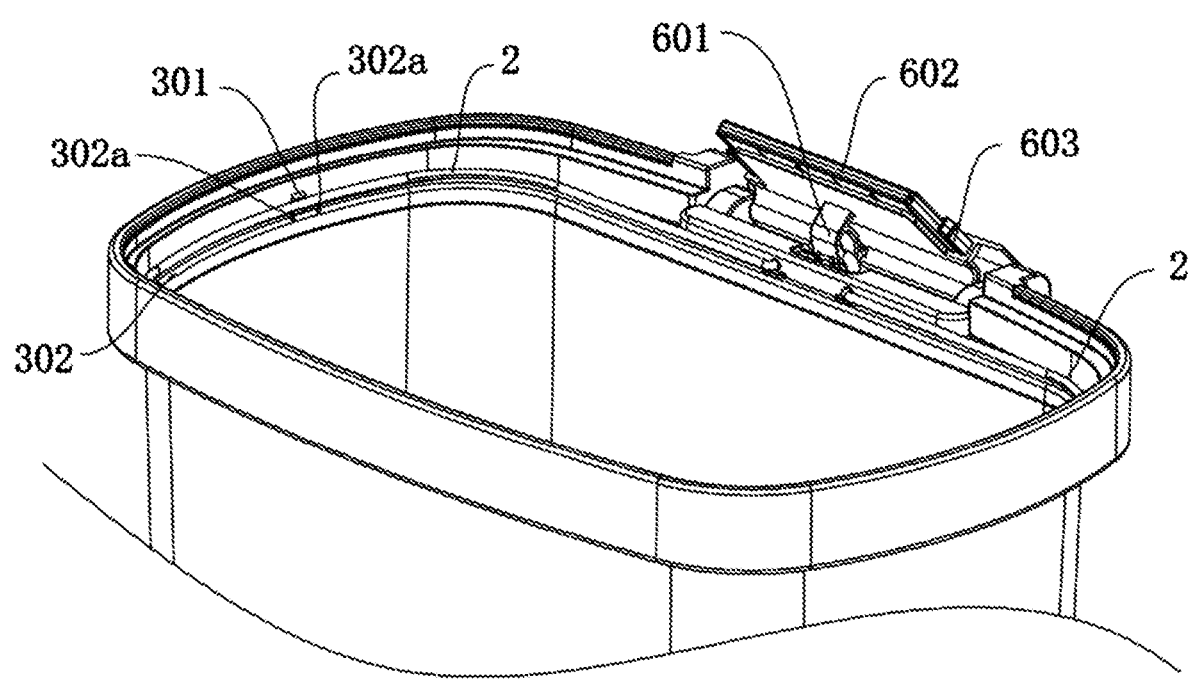
FIG. 5 structurally depicts an opening of the trash can according to an embodiment of the present disclosure.
Figure 6:
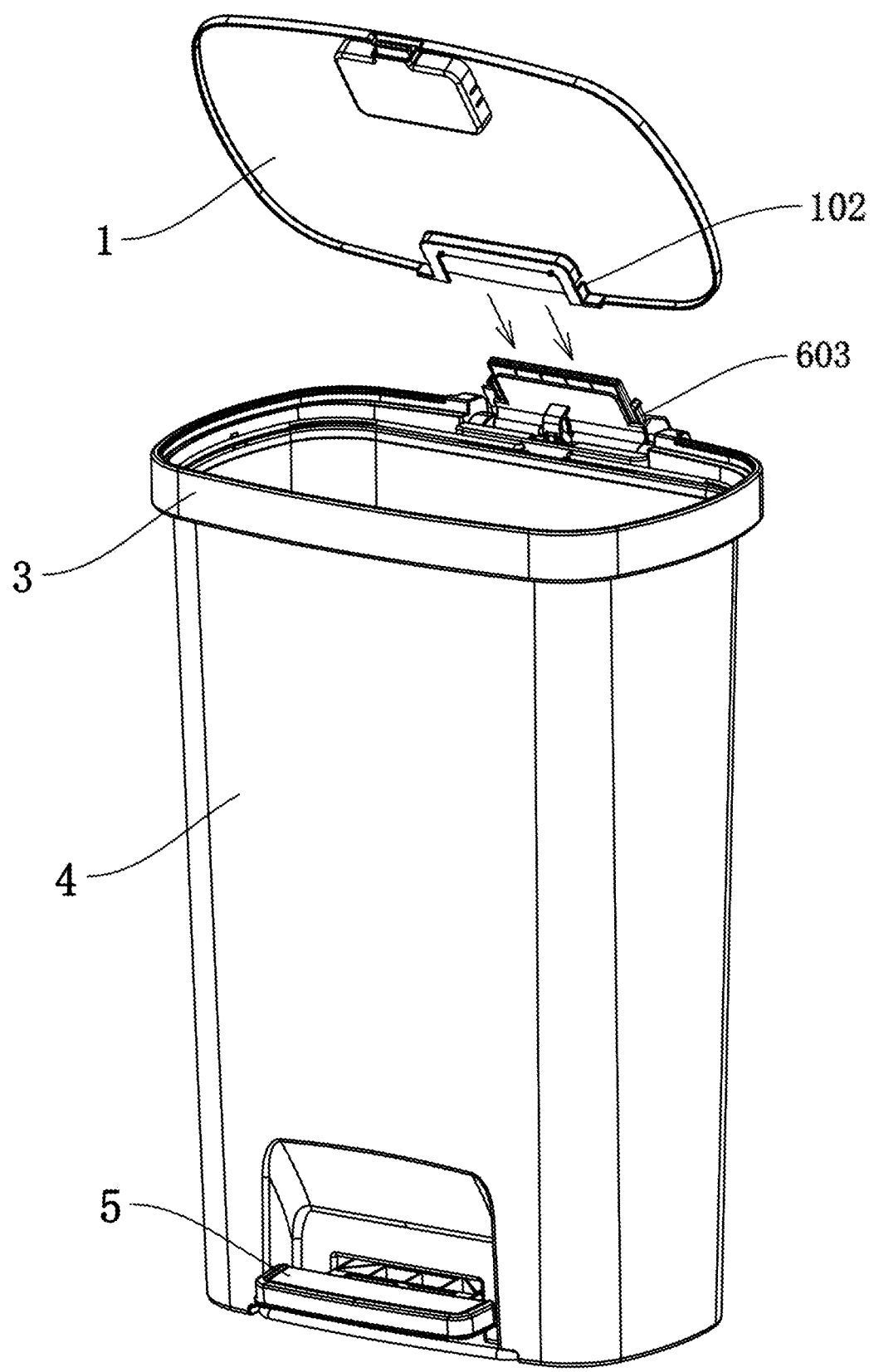
FIG. 6 illustrates an assembly of the lid to a trash can body according to an embodiment of the present disclosure.
Figure 7:
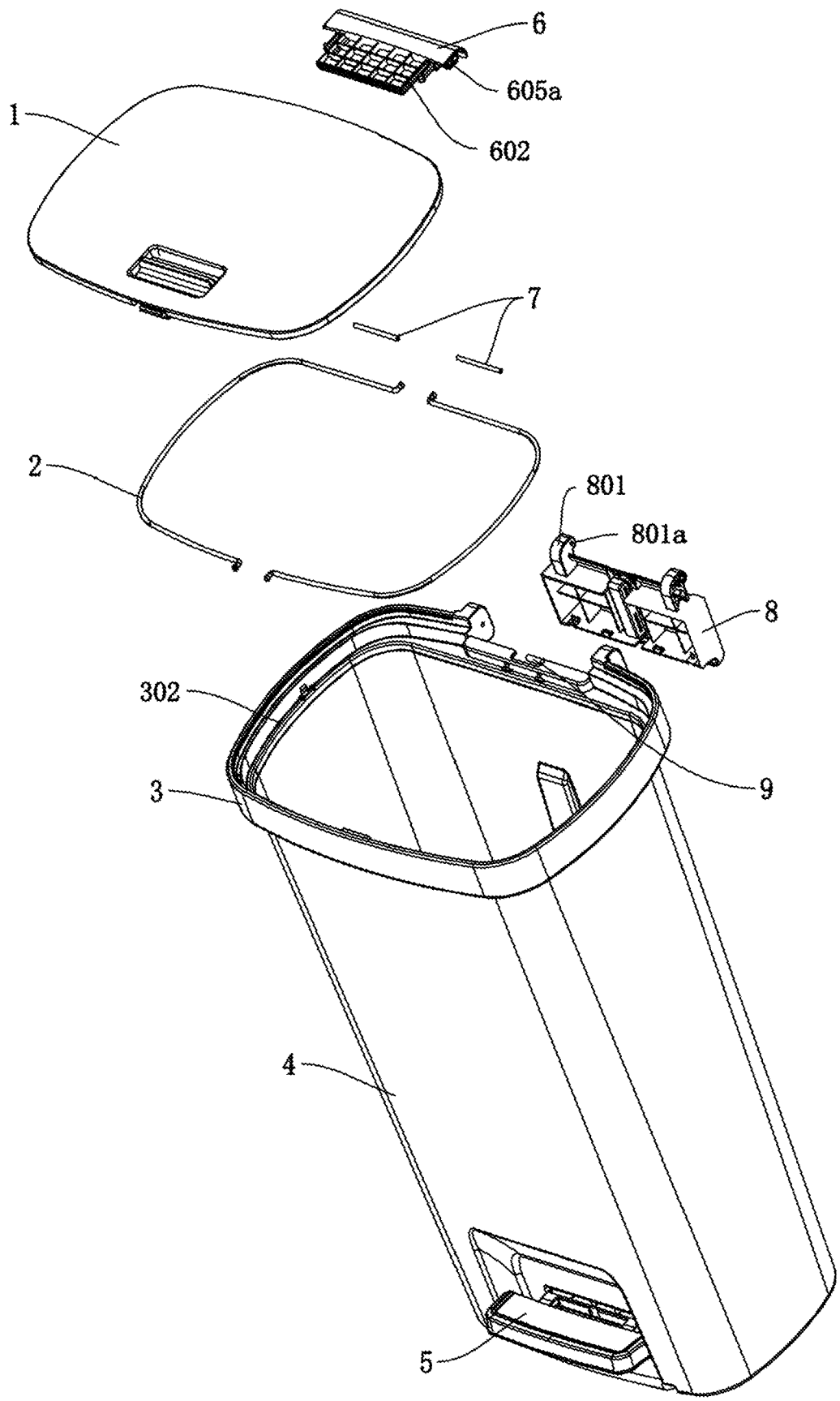
FIG. 7 is an exploded view of the trash can according to an embodiment of the present disclosure.
Figure 8:
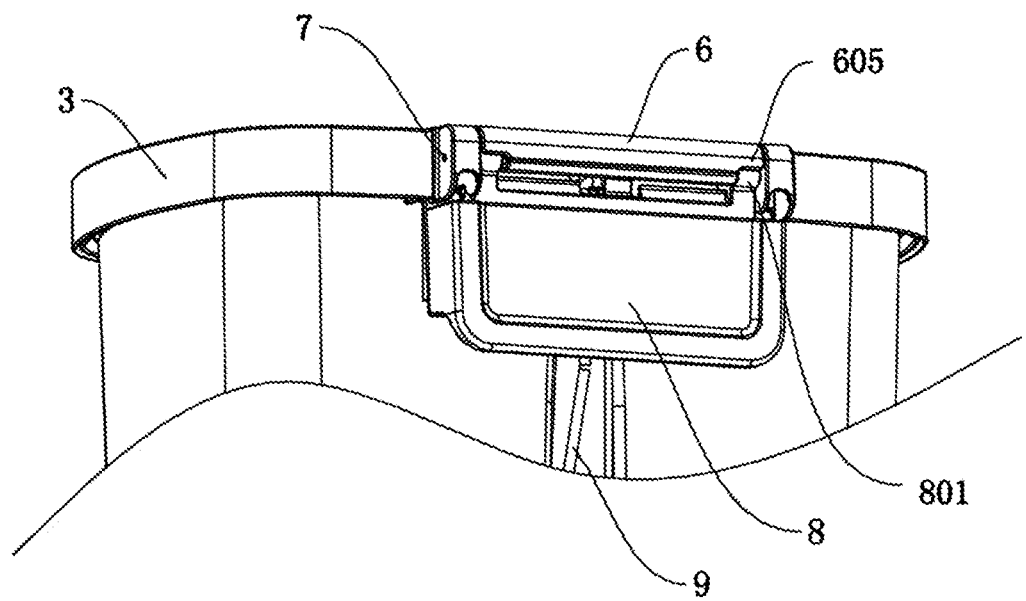
FIG. 8 structurally depicts the opening of the trash can according to an embodiment of the present disclosure from another perspective.
Figure 9:
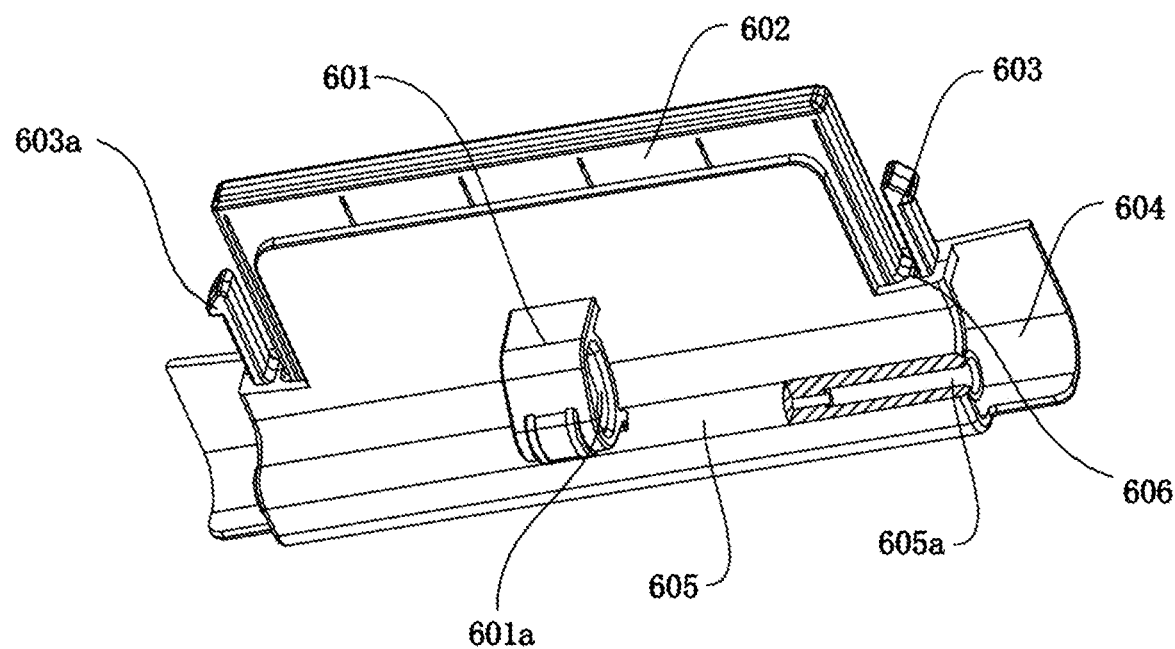
FIG. 9 structurally depicts a connecting part of the trash can according to an embodiment of the present disclosure.

In the drawings: 1, lid; 101, insertion slot; 102, gap; 2, bag pressing ring; 3, decorative ring; 301, second protrusion; 302, first protrusion; 302a, support rib; 4, trash can body; 401, accommodating groove; 5, pedal; 6, connecting part; 601, connecting base; 601a, connecting hole; 602, inserting block; 603, clamping tab; 603a, hook portion; 604, abutting portion; 605, rotatable connecting shaft cylinder; 605a, second shaft hole; 606, clearance; 7, rotatable connection shaft; 8, mounting shell; 801, shaft hole base; 801a, first shaft hole; 801b, projection; and 9, support rod.

DETAILED DESCRIPTION OF EMBODIMENTS

The present disclosure will be described in detail below with reference to the embodiments and accompanying drawings. Obviously, described below are merely some embodiments of this disclosure, and are not intended to limit the disclosure. Other embodiments obtained by those skilled in the art based on the embodiments provided herein without paying any creative effort should fall within the scope of the present disclosure.

As used herein, terms "center", "vertical", "horizontal", "length", "width", "thickness", "top", "bottom", "front", "back", "left", "right", "vertical", "horizontal", "top", "bottom", "inside", "outside", "clockwise", "anticlockwise", "axial", "radial" and "circumferential" refer to orientational or positional relationship shown in the drawings, which are merely for better description of the present disclosure instead of indicating or implying that the device or element referred to must have a specific orientation, or be constructed and operated in a specific orientation. Therefore, these terms should not be construed as a limitation to the present disclosure.

Embodiment 1

Referring to FIGS. 1-9, a trash can includes a trash can body 4 and a lid 1, which are in a split-type (detachable) design.

A decorative ring 3 and at least one connecting part 6 are provided at an opening of the trash can body 4. The connecting part 6 is capable of rotating with respect to the trash can body 4. The decorative ring 3 and the at least one connecting part 6 do not hinder the stacking of multiple trash can bodies 4.

The decorative ring 3 is stationary with respect to the trash can body 4, and the trash can enter the trash can body 4 through an inner ring of the decorative ring 3.

The connecting part 6 is arranged in snap-fit connection with the lid 1. The lid 1 is stationary with respect to the connecting part 6 after arranged in snap-fit connection. The connecting part 6 is configured to drive the lid 1 to flip with respect to the trash can body 4 and the decorative ring 3. The lid 1 covers at least the inner ring of the decorative ring 3.

Firstly, the split-type design of the trash can body 4 and the lid 1 allows trash can bodies 4 to be stacked, which reduces a transportation volume, facilitating to control the transportation cost.

In addition, a rotary connection structure of the trash can body 4 and the lid 1 is the main stress structure, thus needs great connection and structural strength. However, the great connection and structural strength leads to higher installation requirement. Therefore, the rotatable connecting part is pre-installed at the opening before delivery, such that users just need to install a simple snap-fit structure. Since the connecting part is pre-installed before delivery, a structure of the connecting part can be designed to have higher structural strength and more difficult installation to ensure a duration. The snap-fit structure which is not the main stress structure can be designed with lower strength but simple installation, improving user experience and reducing the return rate.

Furthermore, during the selling, the decorative ring 3 pre-installed at the trash can body makes the trash can more pretty and easier to attract the consumers' attention.

The design of this application is suitable for all trash cans with a flip lid. Specifically, a trash can with a flip lid and a pedal 5 is provided.

In an embodiment, the trash can further includes a pedal 5. The pedal 5 is arranged at a bottom end of the trash can body 4. The pedal 5 is connected to the connecting part 6 through a support rod 9. The pedal 5 is configured to drive the lid 1 to flip with respect to the trash can body 4.

The connecting part 6 is provided with a connecting base 601. The connecting base 601 is connected to the support rod 9. A middle part of the connecting base 601 is provided with a connecting hole 601a. The connecting hole 601a is horizontally and penetratedly arranged at the middle part of the connecting base 601. A top end of the support rod 9 is penetratedly arranged in the connecting hole 601a. The connecting part 6 and the support rod 9 are pre-installed, therefor users are free from installation of the support rod 9, simplifying user installation process. The trash can structure provided herein can be applied to various types of trash can products, and can simplify the user installation process.

An accommodating groove 401 is arranged on the trash can body 4 above the pedal 5, and is recessed inward. The pedal 5 is capable of folding upward to be stored in the accommodating groove 401. Accordingly, the pedal 5 and the support rod 9 can be pre-installed, and the pedal 5 can be stored in the accommodating groove 401, avoiding to hinder the stacking of multiple trash can bodies 4.

The rotatable connecting part 6 further includes at least one rotatable connection shaft 7. The opening of the trash can body 4 is provided with a shaft hole base 801. The shaft hole base 801 is provided with a first shaft hole 801a. The connecting part 6 is provided with a second shaft hole 605a.

The least one rotatable connection shaft 7 is configured to be inserted in the first shaft hole 801a and the second shaft hole 605a, such that the connecting part 6 is coaxially hinged with the trash can body 4.

Specifically, since one rotatable connection shaft 7 comes a long inserting distance and inconvenient alignment assembly, two rotatable connection shafts 7 are provided. The two rotatable connection shafts 7 are inserted in the first shaft hole 801a and the second shaft hole 605a from two opposite directions.

The connecting part 6 is provided with a rotatable shaft cylinder 605. A left inner side and a right inner side of the rotatable shaft cylinder 605 each are provided with a two-step shaft hole. An outer shaft hole of the two-step shaft hole is the second shaft hole 605a. A diameter of an inner shaft hole of the two-step shaft holes is less than a diameter of the rotatable connection shaft 7, so as to limit an insertion of the rotatable connection shaft 7, indicating that the rotatable connection shaft 7 has been installed at a designed position.

Figure 10:
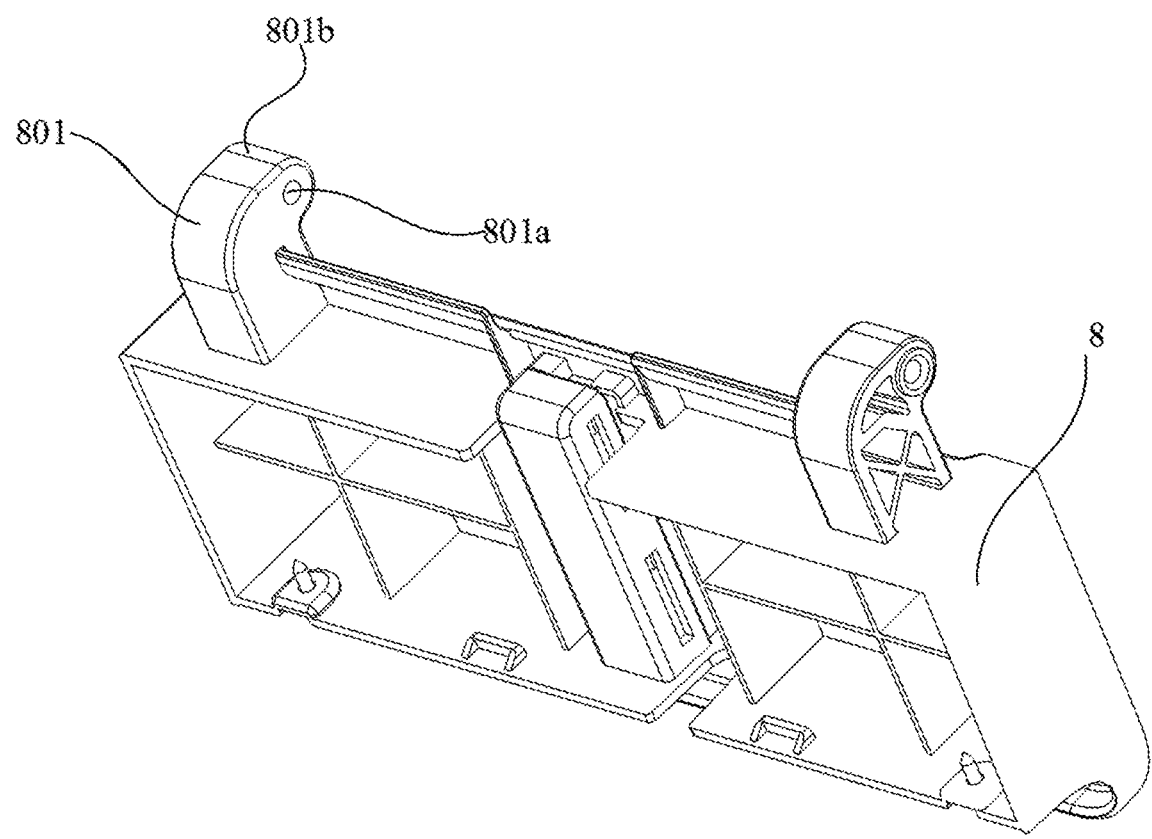
FIG. 10 structurally depicts a mounting shell of the trash can according to an embodiment of the present disclosure.

Referring to an embodiment shown in FIG. 10, a mounting shell 8 is fixedly arranged at a position on the trash can body 4 close to the opening. The mounting shell 8 can be used for the installation of functional parts such as a buffer, and to cover the structure around the opening of the trash can body 4. Two shaft hole bases 801 are respectively and symmetrically arranged at two sides of a top of the mounting shell 8. The two shaft hole bases 801 are respectively arranged at two sides of the rotatable connecting shaft cylinder 605. The connecting part 6 has two abutting portions 604 respectively arranged at two outer sides of the rotatable connecting shaft cylinder 605. The two abutting portions 604 are configured to abut against a projection 801b on the shaft hole base 801 after the lid 1 is turned over at a certain angle. The projection 801b extends in a direction away from the trash can body 4. The first shaft hole 801a is arranged at a middle of the projection 801b to limit the flipping of the lid 1, preventing excessive flip of the lid 1.

The lid 1 is provided with an insertion slot 101. The connecting part 6 is provided with an inserting block 602 matched with the insertion slot 101. The inserting block 602 is matched with the insertion slot 101 to form a snap-fit structure. The inserting block 602 is clamped in the insertion slot 101, such that the lid 1 and the connecting part 6 are assembled.

The snap-fit structure formed by the inserting block 602 and the insertion slot 101 can be common and various. In this embodiment, two side walls of the insertion slot 101 are each provided with a gap 102. The gap 102 has a rectangle shape. A first side of the inserting block 602 is provided with a clamping tab 603 matched with the gap 102. A second side of the inserting block 602 is provided with a clamping tab 603 matched with the gap 102. A hook portion 603a of each clamping tab 603 faces outward. A clearance 606 is provided between each clamping tab 603 and the inserting block 602. A width of each clearance 606 is greater than a width of the hook portion 603a, such that the hook portions 603a are capable of completely exiting from the two gaps 102. The two clamping tabs 603 are elastic, and capable of being inserted inside the insertion slot 101 with the inserting block 602 when the lid 1 is pushed toward the connecting part 6. Since the two clamping tabs 603 are elastic, the two clamping tabs 603 are squeezed to move toward the inserting block 602, therefore, the two clamping tabs 603 can elastically deform toward the inserting block 602, and the hook portions 603a of each clamping tab 603 is clamped at the two gaps 102, realizing the clamp connection between the connecting part 6 and the lid 1. It facilitates the installation of the lid 1. The penetrative gaps 102 enables the user to see that the hook portions 603a are clamped with the gaps 102, so as to stop applying force when the lid 1 is mounted, preventing breakdown due to excessive force.

Specifically, a cross section of each clamping tab 603 is triangular. A bottom end of each clamping tab 603 is protruded to abut to the gaps 102.

The decorative ring 3 is rotatably connected to at least one bag pressing ring 2. In an embodiment, the number of the bag pressing ring 2 is two. The two bag pressing rings 2 are configured to press and fix a mouth of a garbage bag, preventing an edge of the garbage bag from leakage. An inner side wall of the decorative ring 3 is provided with a first protrusion 302. the first protrusion 302 is annular. The bag pressing rings 2 are horizontally placed at the first protrusion 302. The bag pressing rings 2 do not shelter an inside of the decorative ring 3, that is, do not affect throwing trashes into the trash can.

Specifically, the decorative ring 3 is provided with at least one second protrusion 301 above the first protrusion 302. In an embodiment, two second protrusions 301 are symmetrically arranged at a left side and a right side of the decorative ring 3. A support rib 302a is arranged on a top surface of the first protrusion 302 and corresponding to two sides of the second protrusions 301. Each bag pressing ring 2 is clamp between the support rib 302a and the second protrusion 301. The second protrusion 301 prevents the bag pressing ring 2 from random rotation, and can better fix the edge of garbage bag. The support rib 302a provides a space for a finger to extend into below the bag pressing ring 2, facilitating to apply force to pull out the bag pressing ring 2 to replace the garbage bag.

Embodiment 2

Figure 11:
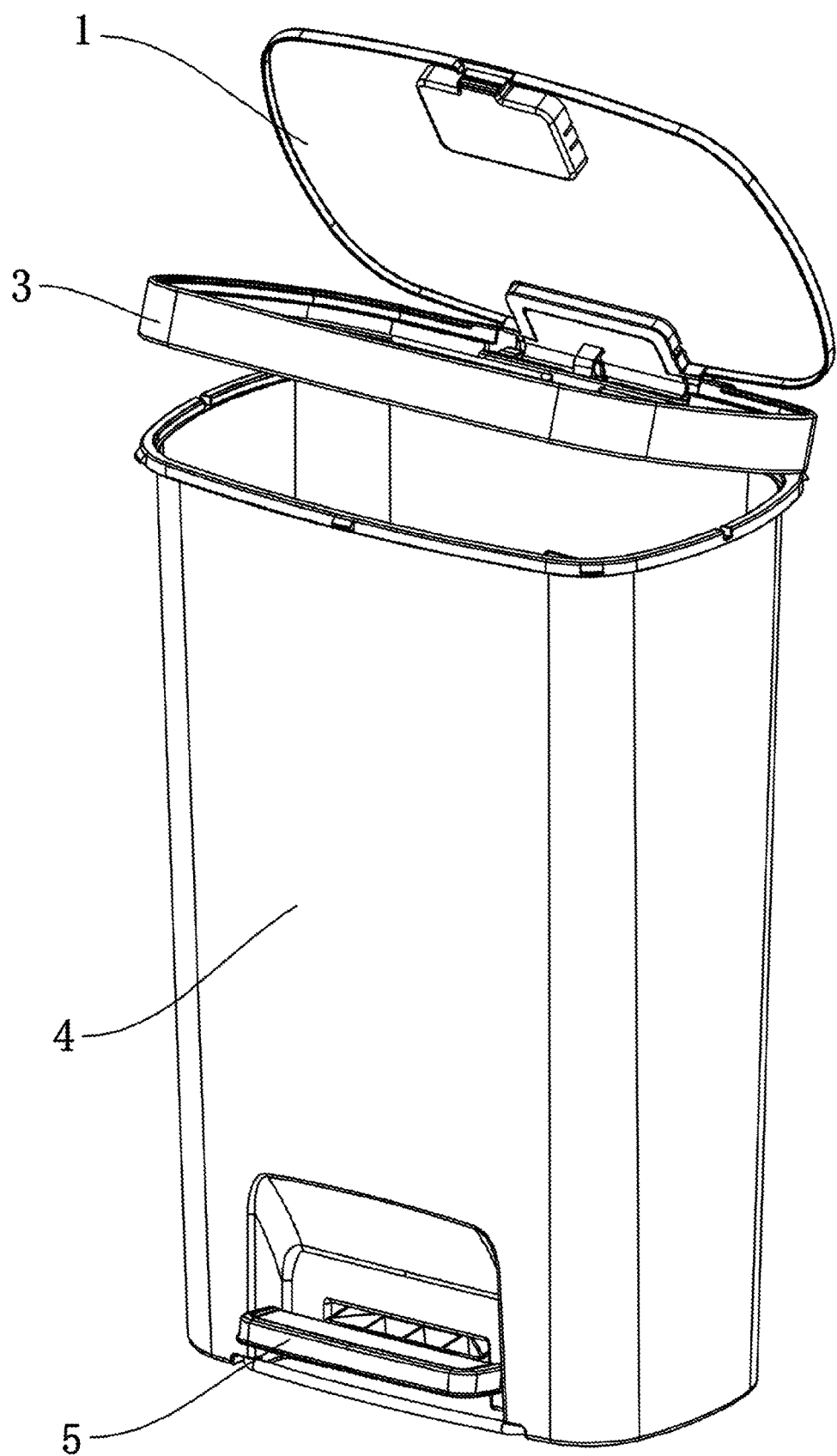
FIG. 11 schematically depicts a structure of a trash can according to Embodiment 2 of the present disclosure.

Referring to FIG. 11, a trash can having includes a trash can body 4 and a lid 1, which are in a split-type (detachable) design.

An opening of the trash can body 4 is provided with a decorative ring 3 and a connecting part 6, where the decorative ring 3 is rotatable, and the connecting part 6 is capable of rotating with respect to the trash can body 4. An inner ring size of the decorative ring 3 is same to an inner side size of the trash can body 4. The decorative ring 3 and the connecting part 6 do not hinder the stacking of trash can bodies 4.

The decorative ring 3 is pre-installed and capable of flipping with respect to the trash can body 4 and the lid 1. The decorative ring 3 is arranged at an opening of the trash can body 4. The decorative ring 3 is configured to allow trash to enter an interior of the trash can body 4.

The connecting part 6 is in snap-fit connection with the lid 1. The lid 1 is stationary with respect to the connecting part 6 after arranged in snap-fit connection. The lid 1 is capable of flipping with respect to the trash can body 4 and the decorative ring 3. The lid 1 covers at least the inner ring of the decorative ring 3.

In this embodiment, the trash can further includes at least one rotatable connection shaft 7. The opening of the trash can is provided with a shaft hole base 801. The shaft hole base 801 is provided with a first shaft hole 801a. The connecting part 6 is provided with a second shaft hole 605a. The decorative ring 3 is provided with a third shaft hole.

The rotatable connection shaft 7 is configured to be inserted in the first shaft hole 801a, the second shaft hole 605a and the third shaft hole, such that the decorative ring 3, the connecting part 6 and the trash can 4 are coaxially hinged.

Specifically, since one rotatable connection shaft 7 comes a long inserting distance and inconvenient alignment assembly, two rotatable connection shafts 7 are provided. The two rotatable connection shafts 7 are configured to be inserted in the first shaft hole 801a, the second shaft hole 605a and the third shaft hole from two opposite directions.

The trash can described in Embodiment 2 is same to the trash can described in Embodiment 1 except the decorative ring 3 and relative structures thereof.

Described above are only some embodiments of the present disclosure, which are not intended to limit the disclosure. Any variations and modifications made by those of ordinary skilled in the art without departing from the spirit of the disclosure should fall within the scope of the disclosure defined by the appended claims. In addition, specific terms used herein should not be construed as a limitation to the present disclosure.

What is claimed is:

1. A trash can, comprising:
a trash can body;
a lid; and
a connecting part;
wherein the lid is arranged at an opening of the trash can body; and the lid is capable of flipping with respect to the trash can body, and is configured to cover the opening of the trash can body; and
the connecting part is arranged at the opening of the trash can body; the connecting part is in snap-fit connection with the lid; and the connecting part is capable of flipping with respect to the trash can body to drive the lid to flip with respect to the trash can body;
wherein the lid is provided with an insertion slot; the connecting part comprises an inserting block and a rotatable connecting shaft cylinder; the inserting block is arranged at a top end of the rotatable connecting shaft cylinder; the rotatable connecting shaft cylinder is coaxially connected to the trash can body, such that the connecting part is capable of flipping with respect to the trash can body; and the inserting block is configured to be inserted into the insertion slot to enable snap-fit connection between the connecting part and the lid.

2. The trash can of claim 1, wherein the connecting part further comprises two clamping tabs; the two clamping tabs are arranged at the top end of the rotatable connecting shaft cylinder; one of the two clamping tabs is provided at a first side of the inserting block, and the other of the two clamping tabs is provided at a second side of the inserting block; a clearance is provided between each of the two clamping tabs and the inserting block; the two clamping tabs are elastic; and two side walls of the insertion slot are each provided with a gap; and the two clamping tabs are configured to be respectively clamped in gaps of the two side walls of the insertion slot to fix the inserting block with respect to the insertion slot.

3. The trash can of claim 2, wherein the connecting part further comprises a connecting base; one end of the connecting base is connected to the rotatable connecting shaft cylinder, and the other end of the connecting base is connected to the inserting block; and the trash can further comprises a pedal and a support rod; the pedal is arranged at a bottom end of an outer side wall of the trash can body; and one end of the support rod is connected to the pedal, and the other end of the support rod is connected to the connecting base, so as to drive the lid to flip.

4. The trash can of claim 3, further comprising:

at least one rotatable connection shaft; and a shaft hole base;

wherein the shaft hole base is arranged at the opening of the trash can body, and is provided with a first shaft hole; the rotatable shaft cylinder is provided with a second shaft hole; and the at least one rotatable connection shaft is configured to be inserted into the first shaft hole and the second shaft hole to coaxially connect the rotatable connecting shaft cylinder with the shaft hole base, such that the connecting part is capable of flipping with respect to the trash can body.

5. The trash can of claim 4, wherein an accommodating groove is arranged at the outer side wall of the trash can body; the pedal is arranged inside the accommodating groove; and the pedal is capable of flipping with respect to the trash can body, so as to be accommodated inside the accommodating groove.

6. The trash can of claim 4, further comprising:

a decorative ring;

wherein the decorative ring is arranged at the opening of the trash can body; the decorative ring is configured to allow trash to enter an interior of the trash can body; and the lid is configured to cover an inner ring of the decorative ring.

7. The trash can of claim 6, wherein the decorative ring is coaxially connected to the shaft hole base; and the decorative ring is capable of rotating with respect to the shaft hole base.

8. The trash can of claim 7, wherein the decorative ring is provided with a third shaft hole; and the at least one rotatable connection shaft is configured to be inserted into the first shaft hole, the second shaft hole and the third shaft hole to coaxially connect the decorative ring, the rotatable connecting shaft cylinder and the shaft hole base, such that the decorative ring is capable of flipping with respect to the trash can body.

9. The trash can of claim 6, wherein the trash can further comprises a bag pressing ring; an inner side wall of the decorative ring is provided with a first protrusion; the first protrusion is annular; and the bag pressing ring is provided at the first protrusion.

10. The trash can of claim 9, further comprising:

a second protrusion; and a support rib;

wherein the second protrusion is arranged at the inner side wall of the decorative ring, and above the first protrusion; the support rib is arranged at the first protrusion, and below the second protrusion; and the second protrusion is configured to match with the support rib to clamp the bag pressing ring between the second protrusion and the support rib.

* * * * *